(12) United States Patent
Patwardhan

(10) Patent No.: US 7,970,894 B1
(45) Date of Patent: Jun. 28, 2011

(54) METHOD AND SYSTEM FOR MONITORING OF WIRELESS DEVICES IN LOCAL AREA COMPUTER NETWORKS

(75) Inventor: Aniruddha Patwardhan, Pune (IN)

(73) Assignee: AirTight Networks, Inc., Mountain View, CA (US)

( * ) Notice: Subject to any disclaimer, the term of this patent is extended or adjusted under 35 U.S.C. 154(b) by 272 days.

(21) Appl. No.: 11/940,339

(22) Filed: Nov. 15, 2007

(51) Int. Cl.
*G06F 15/173* (2006.01)
*H04W 4/00* (2009.01)
*H04L 12/28* (2006.01)

(52) U.S. Cl. ........ 709/224; 370/254; 370/338; 370/446; 455/465; 713/170

(58) Field of Classification Search .................. 709/206; 370/270, 338
See application file for complete search history.

(56) References Cited

U.S. PATENT DOCUMENTS

| | | | |
|---|---|---|---|
| 5,987,611 A | 11/1999 | Freund | |
| 6,363,056 B1 | 3/2002 | Beigi | |
| 6,618,355 B1 | 9/2003 | Gulliford et al. | |
| 6,647,418 B1 | 11/2003 | Maria et al. | |
| 6,697,337 B1 | 2/2004 | Cafarelli et al. | |
| 6,697,870 B1 | 2/2004 | Cafarelli et al. | |
| 6,701,432 B1 | 3/2004 | Deng et al. | |
| 6,728,670 B2 | 4/2004 | Schenkel et al. | |
| 6,735,702 B1 | 5/2004 | Vavatkar et al. | |
| 6,745,333 B1 | 6/2004 | Thomsen | |
| 6,753,702 B2 | 6/2004 | Mizuno et al. | |
| 6,754,488 B1 | 6/2004 | Won et al. | |
| 6,897,776 B1 | 5/2005 | Haycraft | |
| 6,957,067 B1 | 10/2005 | Iyer et al. | |
| 7,002,943 B2 | 2/2006 | Bhagwat et al. | |
| 7,035,633 B2 | 4/2006 | Kirkpatrick | |
| 7,042,852 B2 | 5/2006 | Hrastar | |
| 7,058,796 B2 | 6/2006 | Lynn et al. | |
| 7,110,756 B2 | 9/2006 | Diener | |
| 7,127,524 B1 | 10/2006 | Renda et al. | |
| 7,154,874 B2 | 12/2006 | Bhagwat et al. | |

(Continued)

FOREIGN PATENT DOCUMENTS

GB 2389483 A 12/2003

(Continued)

OTHER PUBLICATIONS

Chirumamilla et al., Agent based intrusion detection and response system for wireless LANs, IEEE International Conference on Communications (ICC), May 11-15, 2003, pp. 492-496, vol. 1.

(Continued)

*Primary Examiner* — Ashok B Patel
*Assistant Examiner* — Linglan Edwards
(74) *Attorney, Agent, or Firm* — AirTight Networks; Hemant M. Chaskar

(57) ABSTRACT

A method and a system for detecting access point devices that provide unauthorized wireless access to local area computer networks is provided. The method includes transferring one or more marker packets to the wired portion of the local area network. The one or more marker packets include an authentication data that is computed based at least upon identify of the wirelessly active access point device and a secret key. The method includes processing one or more wireless frames transmitted from the wirelessly active access point device to extract and to verify at least a portion of the authentication data.

14 Claims, 9 Drawing Sheets

U.S. PATENT DOCUMENTS

| | | |
|---|---|---|
| 7,154,888 B1 | 12/2006 | Li et al. |
| 7,216,365 B2 | 5/2007 | Bhagwat et al. |
| 7,236,470 B1 | 6/2007 | Bims |
| 7,257,107 B2 | 8/2007 | Swier et al. |
| 7,277,404 B2 | 10/2007 | Tanzella et al. |
| 7,286,515 B2 | 10/2007 | Olson et al. |
| 7,302,269 B1 | 11/2007 | Crawford et al. |
| 7,307,980 B1 | 12/2007 | Shah |
| 7,316,031 B2 | 1/2008 | Griffith et al. |
| 7,331,061 B1 | 2/2008 | Ramsey |
| 7,336,670 B1 | 2/2008 | Calhoun |
| 7,339,914 B2 | 3/2008 | Bhagwat et al. |
| 7,340,768 B2 | 3/2008 | Rosenberger |
| 7,346,065 B2 | 3/2008 | Kobayashi |
| 7,383,577 B2 | 6/2008 | Hrastar et al. |
| 7,440,434 B2 | 10/2008 | Chaskar et al. |
| 7,453,840 B1 | 11/2008 | Dietrich |
| 7,478,420 B2 | 1/2009 | Wright et al. |
| 7,540,028 B2 | 5/2009 | Ahmed et al. |
| 7,676,226 B2 * | 3/2010 | Han et al. .................. 455/436 |
| 2001/0052014 A1 | 12/2001 | Sheymov et al. |
| 2002/0143935 A1 | 10/2002 | Schenkel et al. |
| 2002/0167965 A1 * | 11/2002 | Beasley et al. |
| 2003/0051032 A1 | 3/2003 | Schenkel et al. |
| 2003/0051167 A1 | 3/2003 | King et al. |
| 2003/0051170 A1 * | 3/2003 | Spearman |
| 2003/0106067 A1 * | 6/2003 | Hoskins et al. |
| 2003/0126468 A1 | 7/2003 | Markham |
| 2003/0135762 A1 | 7/2003 | Macaulay |
| 2003/0149891 A1 | 8/2003 | Thompsen |
| 2003/0161265 A1 | 8/2003 | Cao et al. |
| 2003/0167405 A1 | 9/2003 | Freund et al. |
| 2003/0185244 A1 | 10/2003 | Wu et al. |
| 2003/0186679 A1 | 10/2003 | Challener et al. |
| 2003/0188012 A1 | 10/2003 | Ford |
| 2003/0195002 A1 * | 10/2003 | Singhal et al. |
| 2003/0217283 A1 | 11/2003 | Hrastar et al. |
| 2003/0217289 A1 | 11/2003 | Ammon et al. |
| 2003/0219008 A1 | 11/2003 | Hrastar |
| 2003/0221006 A1 | 11/2003 | Kuan et al. |
| 2003/0229703 A1 | 12/2003 | Falola et al. |
| 2003/0232598 A1 | 12/2003 | Aljadeff et al. |
| 2003/0233567 A1 | 12/2003 | Lynn et al. |
| 2003/0236990 A1 | 12/2003 | Hrastar et al. |
| 2004/0003285 A1 | 1/2004 | Whelan et al. |
| 2004/0008652 A1 | 1/2004 | Tanzella et al. |
| 2004/0023640 A1 | 2/2004 | Ballai |
| 2004/0028017 A1 | 2/2004 | Whitehill et al. |
| 2004/0047356 A1 | 3/2004 | Bauer |
| 2004/0049695 A1 | 3/2004 | Choi et al. |
| 2004/0049699 A1 | 3/2004 | Griffith et al. |
| 2004/0078151 A1 | 4/2004 | Aljadeff et al. |
| 2004/0078717 A1 | 4/2004 | Allred et al. |
| 2004/0085906 A1 | 5/2004 | Ohtani et al. |
| 2004/0098485 A1 | 5/2004 | Larson et al. |
| 2004/0098610 A1 | 5/2004 | Hrastar |
| 2004/0103282 A1 | 5/2004 | Meier et al. |
| 2004/0107219 A1 | 6/2004 | Rosenberger |
| 2004/0111640 A1 | 6/2004 | Baum |
| 2004/0143751 A1 | 7/2004 | Peikari |
| 2004/0157624 A1 | 8/2004 | Hrastar |
| 2004/0203764 A1 | 10/2004 | Hrastar et al. |
| 2004/0209617 A1 | 10/2004 | Hrastar |
| 2004/0209634 A1 | 10/2004 | Hrastar |
| 2004/0210654 A1 | 10/2004 | Hrastar |
| 2004/0215972 A1 | 10/2004 | Sung et al. |
| 2004/0218602 A1 | 10/2004 | Hrastar et al. |
| 2005/0025182 A1 | 2/2005 | Nazari |
| 2005/0030929 A1 | 2/2005 | Swier et al. |
| 2005/0039047 A1 | 2/2005 | Raikar et al. |
| 2005/0042999 A1 | 2/2005 | Rappaport |
| 2005/0050365 A1 | 3/2005 | Seki et al. |
| 2005/0055578 A1 * | 3/2005 | Wright et al. |
| 2005/0094568 A1 | 5/2005 | Judd |
| 2005/0094630 A1 | 5/2005 | Valdevit |
| 2005/0111460 A1 | 5/2005 | Sahita |
| 2005/0114700 A1 | 5/2005 | Barrie et al. |
| 2005/0174961 A1 | 8/2005 | Hrastar |
| 2005/0195753 A1 * | 9/2005 | Chaskar et al. .................. 370/254 |
| 2005/0226195 A1 | 10/2005 | Paris et al. |
| 2005/0254474 A1 * | 11/2005 | Iyer et al. .................. 370/338 |
| 2005/0259611 A1 | 11/2005 | Bhagwat et al. |
| 2006/0123133 A1 | 6/2006 | Hrastar |
| 2006/0193300 A1 * | 8/2006 | Rawat et al. |
| 2006/0209700 A1 * | 9/2006 | Sundar et al. |
| 2006/0235735 A1 | 10/2006 | Sagfors et al. |
| 2007/0094741 A1 | 4/2007 | Lynn et al. |
| 2007/0180244 A1 | 8/2007 | Halasz et al. |
| 2007/0189290 A1 | 8/2007 | Bauer |
| 2008/0141369 A1 | 6/2008 | Butti et al. |
| 2008/0250498 A1 | 10/2008 | Butti et al. |
| 2009/0279518 A1 * | 11/2009 | Falk et al. .................. 370/338 |

FOREIGN PATENT DOCUMENTS

| | | | |
|---|---|---|---|
| WO | 0193531 | A2 | 6/2001 |
| WO | 2004019559 | A3 * | 3/2004 |
| WO | 2004028121 | A2 | 4/2004 |
| WO | 2004059912 | A1 * | 7/2004 |
| WO | 2004095192 | A2 | 11/2004 |

OTHER PUBLICATIONS

Korba et al., Security system for wireless local area networks, Personal, Indoor and Mobile Radio Communications, Sep. 8-11, 1998, pp. 1550-1554, vol. 3, Boston, USA.

Zhang et al., Intrusion detection techniques for mobile wireless networks, Wireless Networks, Sep. 2003, pp. 545-556, vol. 9, issue 3.

Yang et al., Intrusion detection solution to WLANs, Software Base, Civil Aviation University of China, Tianjin, China, IEEE 6th Circuits and Systems (CAS) Symposium on Emerging Technologies: Mobile and Wireless Communication, Shanghai, China, May 31-Jun. 2, 2004, vol. 2, pp. 553-556.

Hatami et al., In-Building Intruder Detection for WLAN Access, Center for Wireless Information Network Studies, Worcester Polytechnic Institute (WPI), MA, USA, 2004 Position Location and Navigation Symposium, Apr. 26-29, 2004, pp. 592-597.

Yeo et al., A Framework for Wireless LAN Monitoring and Its Applications, Proceedings of the 2004 ACM workshop on Wireless security, Oct. 1, 2004, pp. 70-79.

Bellardo et al., Denial-of-Service Attacks: Real vulnerabilities and Practical Solutions, Department of Computer and Science Engineering, University of California at San Diego, Proceedings of the USENIX Security Symposium, Washington DC, Aug. 2003.

Lim et al., Wireless Intrusion Detection and Response, Proceedings of the 2003 IEEE Workshop on Information Assurance United States Military Academy, West Point, NY, Jun. 2003.

Bellovin: "A Technique for Counting NATed Hots", AT&T Research, IMW02, Nov. 6-8, 2002, Marseille, France, Copyright 2002, pp. 267-272.

Wright: "Detecting Wireless LAN MAC Address Spoofing", Jan. 21, 2003, Copyright 2003, Joshua Wright, 20 pgs.

Source code of a wireless monitoring toll available on the Internet, http://svn.kismetwireless.net/code/tags/kismet-2004-10-R1/CHANGELOG, Jun. 9, 2004, 2 pgs.

Guo et al.: "Sequence Number-Based MAC Address Spoof Detection," in Proceedings of 8th International Symposium on Recent Advances in Intrusion Detection (RAID 2005), Sep. 2005, 20 pgs.

Brian Moran, The hacker's wireless toolbox: part 2, COMPUTERWORLD, alleged Jul. 17, 2003, http://www.computerworld.com/mobiletopics/mobile/story/0,10801,83152,00.html.

* cited by examiner

METHOD AND SYSTEM FOR MONITORING OF WIRELESS DEVICES IN LOCAL AREA COMPUTER NETWORKS

BACKGROUND OF THE INVENTION

The present invention relates generally to wireless computer networking techniques. More particularly, the invention provides a method and a system for detecting unauthorized wireless access for local area computer networks according to a specific embodiment. Merely by way of example, the invention has been applied to a computer networking environment based upon the IEEE 802.11 family of standards, commonly called "WiFi." But it would be recognized that the invention has a much broader range of applicability. For example, the invention can be applied to Ultra Wide Band ("UWB"), IEEE 802.16 commonly known as "WiMAX", Bluetooth, and others.

Computer systems proliferated from academic and specialized science applications to day to day business, commerce, information distribution and home applications. Such systems include personal computers, which are often called "PCs" for short, to large mainframe and server class computers. Powerful mainframe and server class computers run specialized applications for banks, small and large companies, e-commerce vendors and governments. Smaller personal computers can be found in many if not all offices, homes, and even local coffee shops. These computers interconnect with each other through computer communication networks based on packet switching technology such as the Internet protocol or IP. The computer systems located within a specific local geographic area such as office, home or other indoor and outdoor premises interconnect using a Local Area Network, commonly called, LAN. Ethernet is by far the most popular networking technology for LANs. The LANs interconnect with each other using a Wide Area Network called "WAN" such as the famous Internet. Although much progress occurred with computers and networking, we now face a variety of security threats on many computing environments from the hackers connecting to the computer network in an unauthorized fashion. The application of wireless communication to computer networking further accentuates these threats.

As merely an example, the conventional LAN is usually deployed using an Ethernet based infrastructure comprising cables, hubs switches, and other elements. A number of connection ports (e.g., Ethernet ports) are used to couple various computer systems to the LAN. A user can connect to the LAN by physically attaching a computing device such as laptop, desktop or handheld computer to one of the connection ports using physical wires or cables. Other computer systems such as database computers, server computers, routers and Internet gateways also connect to the LAN to provide specific functionalities and services. Once physically connected to the LAN, the user often accesses a variety of services such as file transfer, remote login, email, WWW, database access, and voice over IP. Security of the LAN often occurs by controlling access to the physical space where the LAN connection ports are located.

Although conventional wired networks using Ethernet technology proliferated, wireless communication technologies are increasing in popularity. That is, wireless communication technologies wirelessly connect users to the computer communication networks. A typical application of these technologies provides wireless access to the local area network in the office, home, public hot-spots, and other geographical locations. As merely an example, the IEEE 802.11 family of standards, commonly called WiFi, is the common standard for such wireless application. Among WiFi, the 802.11b standard-based WiFi often operates at 2.4 GHz unlicensed radio frequency spectrum and can offer wireless connectivity at speeds up to 11 Mbps. The 802.11g compliant WiFi can offer even faster connectivity at about 54 Mbps and can operate at 2.4 GHz unlicensed radio frequency spectrum. The 802.11a can provide speeds up to 54 Mbps operating in the 5 GHz unlicensed radio frequency spectrum. The 802.11n can provide speeds up to 600 Mbps using techniques such as channel bonding and MIMO (multiple input multiple output). The WiFi enables a quick and effective way of providing wireless extension to the conventional wired LAN.

In order to provide wireless extension of the LAN using WiFi, one or more WiFi access points (APs) connect to the LAN connection ports either directly or through intermediate equipment such as WiFi switch. A user now wirelessly connects to the LAN using a device equipped with WiFi radio, commonly called wireless station, which communicates with the AP. The connection is free from cable and other physical encumbrances and allows the user to "Surf the Web", check e-mail or use enterprise computer applications in an easy and efficient manner. Unfortunately, certain limitations still exist with WiFi. That is, the radio waves often cannot be contained in the physical space bounded by physical structures such as the walls of a building. Hence, wireless signals often spill outside the area of interest. Unauthorized users can wirelessly connect to the AP and hence gain access to the LAN from the spillage areas such as the street, parking lot, and neighbor's premises. Consequently, the conventional security measure of controlling access to the physical space where the LAN connection ports are located is now inadequate.

In order to prevent unauthorized access to the LAN over WiFi, the AP can employ certain techniques. For example, the user is required to carry out authentication handshake with the AP (or a WiFi switch that resides between the AP and the existing LAN) before being able to connect to the LAN. Examples of such handshake are Wireless Equivalent Privacy (WEP) based shared key authentication, 802.1x based port access control, 802.11i based authentication. The AP can provide additional security measures such as encryption, firewall. Other techniques also exist to enhance security of the LAN over WiFi.

Despite these measures, many limitations still exist. As merely an example, a threat of an unauthorized AP being connected to the LAN often remains with the LANs. The unauthorized AP creates security vulnerability. The unauthorized AP allows wireless intruders to connect to the LAN through itself. That is, the intruder accesses the LAN and any proprietary information on computers and servers on the LAN without the knowledge of the owner of the LAN. Soft APs, ad hoc networks, and misconfigured APs connected to the LAN also pose similar threats. Appropriate security mechanisms are thus needed to protect the LAN resources from wireless intruders.

Accordingly, techniques for improving security for local area network environments are highly desirable.

SUMMARY OF THE INVENTION

The present invention relates generally to wireless computer networking techniques. More particularly, the invention provides a method and a system for detecting unauthorized wireless access for local area computer networks according to a specific embodiment. Merely by way of example, the invention has been applied to a computer networking environment based upon the IEEE 802.11 family of standards, commonly called "WiFi." But it would be recognized that the invention has a much broader range of applicability. For example, the invention can be applied to UWB, WiMAX (802.16), Bluetooth, and others.

In a specific embodiment, the present invention provides a method for detecting access point devices that provide unauthorized wireless access to local area computer networks. The method includes detecting a wirelessly active access point device in a geographic region including a wired portion of a local area network. The method includes transferring one or more marker packets to the wired portion of the local area network. The one or more marker packets have associated with them a predetermined format. Moreover, the one or more marker packets include an authentication data that is computed based at least upon identify of the wirelessly active access point device and a secret key. The one or more marker packets are also adapted to be received from the wired portion of the local area network by at least a subset of access point devices connected to the wired portion of the local area network and to be outputted as wireless frames on wireless medium by the at least the subset of the access point devices. The method includes receiving one or more wireless frames transmitted by the wirelessly active access point device on the wireless medium. Moreover, the method includes processing the one or more wireless frames to determine whether they are in accordance with at least a portion of the predetermined format. The method also includes processing the one or more wireless frames to extract and to verify at least a portion of the authentication data. Additionally, the method includes inferring that the wirelessly active access point device provides wireless access to the wired portion of the local area network based at least upon the at least the portion of the predetermined format being determined and the at least the portion of the authentication data being verified.

In an alternative specific embodiment, the present invention provides a system for detecting access point devices that provide unauthorized wireless access to local area computer networks. The system comprises a wired network interface for coupling the system to a wired portion of a local area network within a geographic region and a wireless network interface for receiving wireless activity within the geographic region. The system comprises a processing unit comprising one or more microprocessor devices for executing computer code and a memory unit coupled to the processing unit for storing computer executable code. The memory unit comprises a computer code for detecting a wirelessly active access point device in the geographic region including the wired portion of a local area network. The memory unit also comprises a computer code for generating one or more marker packets. The one or more marker packets have associated with them a predetermined format. Moreover, the one or more marker packets include an authentication data that is generated based at least upon identify of the wirelessly active access point device and a secret key. The memory unit comprises a computer code for transferring the one or more marker packets to the wired portion of the local area network using the wired network interface. Moreover, the memory unit comprises a computer code for receiving using the wireless interface one or more wireless frames transmitted by the wirelessly active access point device on the wireless medium. The memory unit also comprises a computer code for analyzing the one or more wireless frames to determine whether they are in accordance with at least a portion of the predetermined forma and a computer code for analyzing the one or more wireless frames to extract and to verify at least a portion of the authentication data. Additionally, the memory unit comprises a computer code for generating indication that the wirelessly active access point device provides wireless access to the wired portion of the local area network based at least upon the at least the portion of the predetermined format being determined and the at least the portion of the authentication data being verified.

In yet an alternative specific embodiment, the present invention provides a method for detecting access point devices that provide unauthorized wireless access to local area computer networks. The method includes receiving one or more wireless frames within a geographic region. The geographic region includes a wired portion of a local area network and the one or more wireless frames are associated with an access point device. For example, a wireless frame from the one or more wireless frames is either transmitted by or directed to the access point device operating within a vicinity of the geographic region. The access point device includes a wireless interface and a wireside interface. The one or more wireless frames include identity of the wireless interface of the access point device. The method includes transferring one or more marker packets to the wired portion of the local area network. The one or more marker packets include an authentication data that is computed based at least upon the identity of the wireless interface of the access point device and a secret key. Moreover, the one or more marker packets are adapted to be received from the wired portion of the local area network by at least a subset of access point devices connected to the wired portion of the local area network and to be outputted as wireless frames on wireless medium by the at least the subset of the access point devices. The method includes identifying at least a subset of the one or more wireless frames such that the subset of the one or more wireless frames includes at least a portion of the authentication data. Moreover, the method includes verifying the at least the portion of the authentication data based at least upon the identity of the wireless interface of the access point device and the secret key. The method includes inferring that the wireside interface of the access point device is coupled to the wired portion of the local area network based at least upon the at least the portion of the authentication data being verified and generating indication of unauthorized wireless access to the wired portion of the local are network.

In yet a further alternative specific embodiment, the present invention provides a system for detecting access point devices that provide unauthorized wireless access to local area computer networks. The system comprises a processing unit comprising one or more microprocessor devices for executing computer code and a memory unit coupled to the processing unit for storing computer executable code. The processing unit and the memory unit can be distributed among a one or more sniffers and one or more data collection servers. The memory unit comprises a computer code for receiving one or more wireless frames within a geographic region. For example, the wireless frames are received using the system's wireless interface (e.g., wireless interface of a sniffer device). The geographic region includes a wired portion of a local area network and the one or more wireless frames are associated with an access point device. The access point device includes a wireless interface and a wireside interface. The one or more wireless frames include identity of the wireless interface of the access point device. The memory unit also comprises a computer code for transferring one or more marker packets to the wired portion of the local area network. For example, the marker packets are transferred using the system's wireside interface (e.g., Ethernet interface of a sniffer device or any other device in the system coupled to the wired portion of the local area network). The one or more marker packets include an authentication data that is computed based at least upon the identity of the wireless interface of the access point device and a secret key. Moreover, the one or more marker packets are adapted to be received from the wired portion of the local area network by at least a subset of access point devices connected to the wired portion of the local area network and to be outputted as wireless frames on wireless medium by the at least the subset of the access point devices. The memory unit comprises a computer code for identifying at least a subset of the one or more wireless frames such that the subset of the one or more wireless frames includes at least a portion of the authentication data. Moreover, the memory unit comprises a computer code for verifying the at least the portion of the authentication data based at least upon the identity of the wireless interface of the access point device and the secret key. The memory unit comprises a computer code for inferring that the wireside interface of the access point device is coupled to the wired portion of the local area network based at least upon the at least the portion of the authentication data being verified and a computer code for generating indication of unauthorized wireless access to the wired portion of the local are network.

Certain advantages and/or benefits may be achieved using the present invention. For example, the present technique provides an easy to use process that relies upon conventional computer hardware and software technologies. In some embodiments, the method and system are fully automated and can be used to prevent unauthorized wireless access to local area computer networks. The automated operation minimizes the human effort required during the system operation and improves the system response time and accuracy. The method and system advantageously reduce or eliminate the false positives on intrusion events thereby eliminating the nuisance factor during the system operation. This is because the technique of the invention intelligently distinguishes between Unauthorized APs and External APs, the latter usually being the source of false positives. Moreover, the technique according to the present invention can provide protection from the spoofing attackers. According to specific embodiments, the method and system of invention provide alternatives of client-server implementation or standalone appliance implementation. Additionally, the invention is compatible with conventional wireless and wired networking technologies without substantial modifications to conventional equipment and processes according to a specific embodiment. Depending upon the embodiment, one or more of these benefits may be achieved. These and other benefits will be described in more throughout the present specification and more particularly below.

Other features and advantages of the invention will become apparent through the following detailed description, the drawings, and the claims.

DETAILED DESCRIPTION OF SPECIFIC EMBODIMENTS

The present invention relates generally to wireless computer networking techniques. More particularly, the invention provides a method and a system for detecting unauthorized wireless access for local area computer networks according to a specific embodiment. Merely by way of example, the invention has been applied to a computer networking environment based upon the IEEE 802.11 family of standards, commonly called "WiFi." But it would be recognized that the invention has a much broader range of applicability. For example, the invention can be applied to UWB, WiMAX (802.16), Bluetooth, and others.

Figure 1:
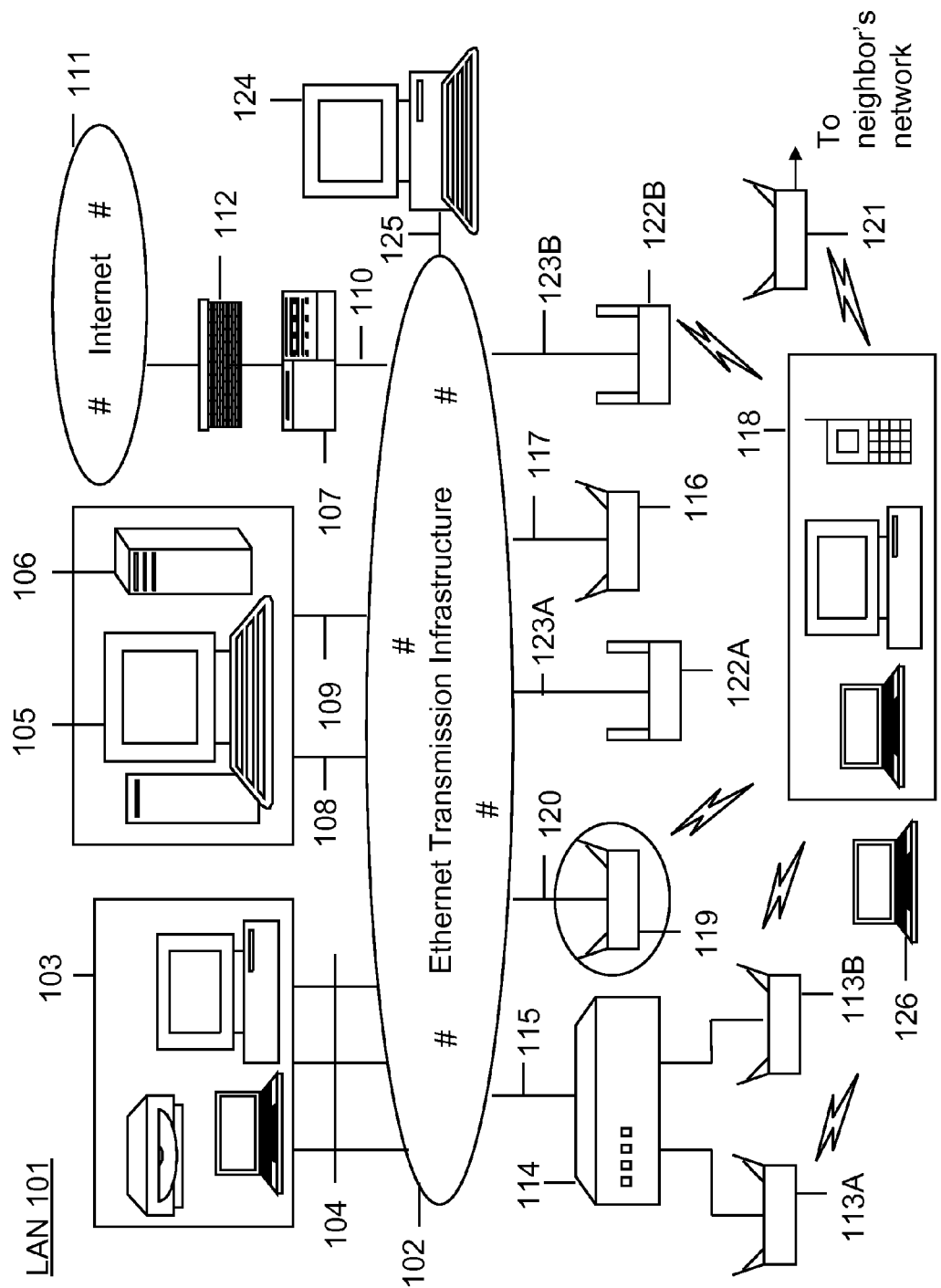
FIG. 1 shows an exemplary LAN environment to support wireless intrusion detection according to an embodiment of the present invention.

FIG. 1 shows an exemplary LAN environment that can support detecting unauthorized wireless access according to an embodiment of the invention. This diagram is merely an example, which should not unduly limit the scope of the claims herein. One of ordinary skill in the art would recognize other variations, modifications, and alternatives. The geographic region of operation of LAN 101 can be a building, a campus, a floor, a region of outdoor space etc. As shown in FIG. 1, the core transmission infrastructure 102 for the LAN 101 comprises of Ethernet cables, hubs and switches. Other devices and alternative devices may also be included. Plurality of connection ports (e.g., Ethernet ports) are provided for the various computer systems to be able to connect to the LAN. One or more end user devices 103 such as desktop computers, notebook computers, telemetry sensors etc. can be connected to the LAN 101 via one or more connection ports 104 using wires (Ethernet cable) or other suitable devices. Other computer systems that provide specific functionalities and services can also be connected to the LAN. For example, one or more database computers 105 may be connected to the LAN via one or more connection ports 108. Examples of information stored in database computers include customer accounts, inventory, employee accounts, financial information etc. One or more server computers 106 may be connected to the LAN via one or more connection ports 109. Examples of services provided by server computers can include database access, email storage, HTTP proxy service, DHCP service, SIP service, authentication, network management etc. The router 107 can be connected to the LAN via connection port 110 and it acts as a gateway between the LAN 101 and the Internet 111. The firewall/VPN gateway 112 protects computers in the LAN against hacking attacks from the Internet 111. It may additionally also enable remote secure access to the LAN.

WiFi is used to provide wireless extension of the LAN. For this, one or more authorized WiFi APs 113A, 113B etc. can be connected to the LAN via WiFi switch 114. The WiFi switch can be connected to the LAN connection port 115. The WiFi switch enables offloading from APs some of the complex procedures for authentication, encryption, QoS, mobility, firewall etc., and can also provides centralized management functionality for APs. One or more authorized WiFi AP 116 may also be directly connected to the LAN connection port 117. In this case AP 116 may itself perform necessary security procedures such as authentication, encryption, firewall, etc. One or more end user devices 118 such as desktop computers, laptop computers, handheld computers (PDAs) equipped with WiFi radio can now wirelessly connect to the LAN via authorized APs 113A, 113B and 116. Although WiFi has been provided according to the present embodiment, there can also be other types of wireless network formats such as UWB, WiMax, Bluetooth, and others.

One or more unauthorized APs can be connected to the LAN. The figure shows unauthorized AP 119 connected to the LAN connection port 120. The unauthorized AP may not employ the right security policies. Also traffic through this AP may bypass security policy enforcing elements such as, for example, WiFi switch 114. The AP 119 thus poses a security threat as intruders such as wireless station 126 can connect to the LAN and launch variety of attacks through this AP. According to a specific embodiment, the unauthorized AP can be a rogue AP, a misconfigured AP, a soft AP, and the like. A rogue AP can be an AP such as for example openly available in the market that is brought in by the person having physical access to the facility and connected to the LAN via the LAN connection port without the permission of the network administrator. A misconfigured AP can be the AP otherwise allowed by the network administrator, but whose security parameters are, usually inadvertently, incorrectly configured. Such an AP can thus allow wireless intruders to connect to it. Soft AP is usually a WiFi enabled computer system connected to the LAN connection port that also functions as an AP under the control of software. The software is either deliberately run on the computer system or inadvertently in the form of a virus program.

The figure also shows a neighboring AP 121 whose radio coverage can spill into the region of operation of the LAN. The AP 121 is however not connected to the concerned LAN 101 and can be harmless from the intrusion standpoint. According to a specific embodiment, the neighboring AP can be an AP in the neighboring office, an AP in the laboratory not connected to the concerned LAN but used for standalone development or experimentation, an AP on the street providing free WiFi access to passersby (e.g., municipal WiFi, metro WiFi etc.) and other APs, which co-exist with the LAN and share the airspace without any significant security implications with respect to providing intruders a way to access the LAN over wireless.

A WiFi AP delivers data packets between the wired LAN and the wireless transmission medium. Typically, the AP performs this function either by acting as a layer 2 bridge or as a network address translator (NAT). The layer 2 bridge type AP simply transmits the Ethernet packet received on its wired interface to the wireless link after translating it to 802.11 style packet and vice versa. The NAT AP on the other hand acts as a layer 3 (IP) router that routes IP packets received on its wired interface to the stations connected to its wireless interface and vice versa. The wired side and wireless side interfaces of the NAT AP thus usually reside on different subnets.

The intrusion detection system according to the present invention is provided to protect the LAN 101 from unauthorized APs and/or wireless intruders. The system includes one or more sensor devices 122A, 122B etc. (generically referred herein as sniffer 122) placed throughout a geographic region or a portion of geographic region including the connection points to the LAN 101. The sniffer is able to monitor the wireless activity in its vicinity. For example, the sniffer listens to the radio channel and captures packets being transmitted on the channel. The sniffer cycles through the radio channels on which wireless communication can take place. On each radio channel, it waits and listens for any ongoing transmission. In an alternative embodiment, the sniffer is able operate on plurality of radio channels simultaneously. Whenever transmission is detected, the relevant information about that transmission is collected and recorded. This information comprises of all or a subset of information that can be gathered from various fields in the captured packet (e.g., 802.11 frame) such as 802.11 MAC (medium access control) header, 802.2 LLC (i.e., logical link control) header, IP header, transport protocol (e.g., TCP, UDP, HTTP, RTP etc.) headers, packet size, packet payload and other fields. Receive signal strength (i.e., RSSI) may also be recorded. Other information such as the day and the time of the day when said transmission was detected may also be recorded. A sniffer 122 can transmit packets over the wireless medium for any functionality that requires sniffer to transmit packets.

Figure 2:
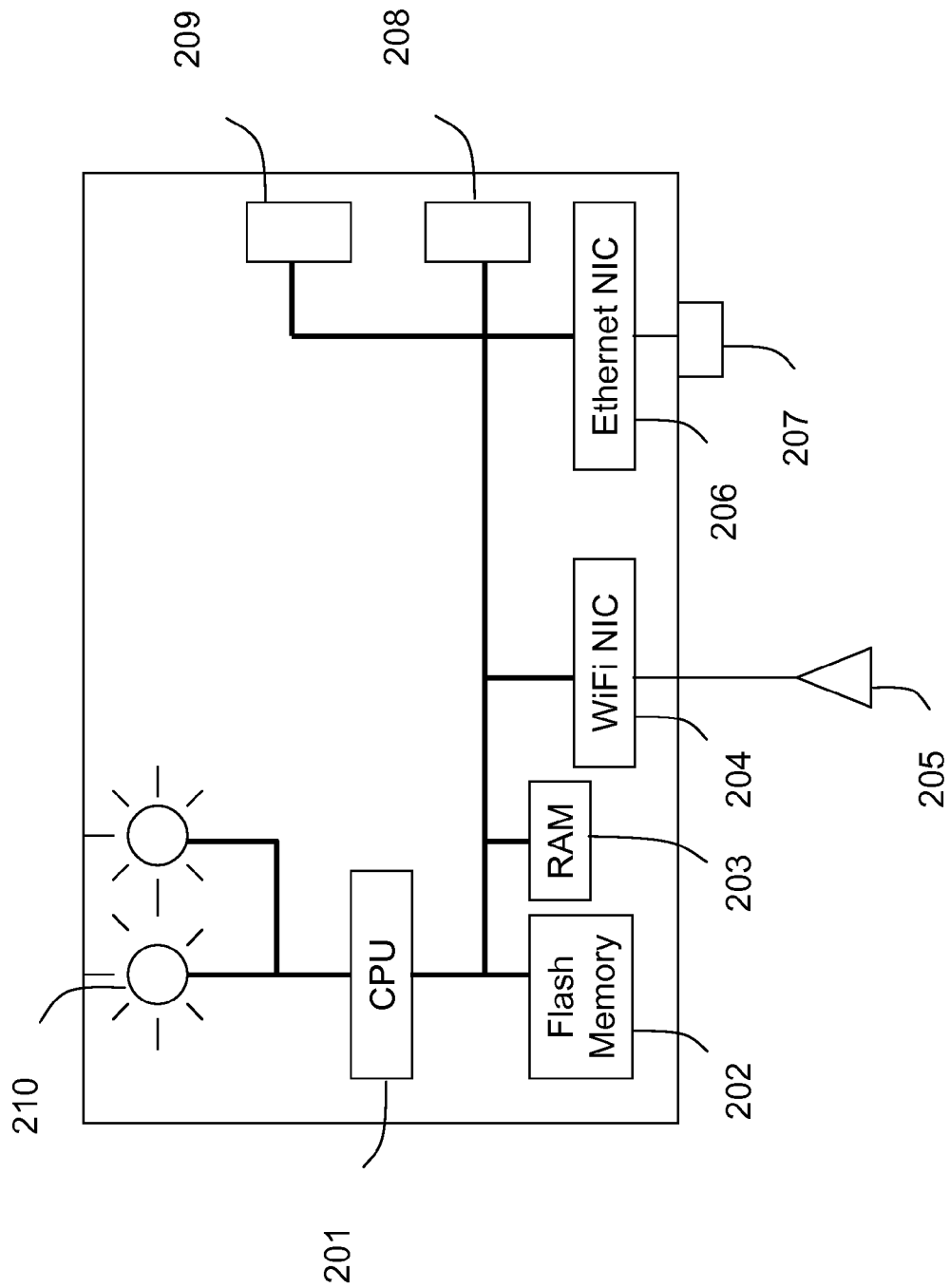
FIG. 2 shows an exemplary schematic hardware diagram of a sniffer device according to an embodiment of the present invention.

An exemplary schematic hardware diagram of the sniffer is shown in FIG. 2. This diagram is merely an example, which should not unduly limit the scope of the claims herein. One of ordinary skill in the art would recognize many variations, alternatives, and modifications. As shown, sniffer 122 can have a central processing unit (CPU) 201, a flash memory 202 where the software code for sniffer functionality resides, and a RAM 203 which can serve as volatile memory during program execution. The sniffer 122 can have one or more 802.11 wireless network interface cards (NICs) 204 which perform radio and wireless MAC layer functionality and one or more of dual-band (i.e., for transmission detection in both the 2.4 GHz and 5 GHz radio frequency spectrums) antennas 205 coupled to the wireless NICs. Each of the wireless NICs 204 can operate in 802.11a, 802.11b, 802.11g, 802.11b/g or 802.11a/b/g mode. In an embodiment, alternatively or in addition to, at least one of the NICs can operate in 802.11n mode. Moreover, the sniffer 122 can have an Ethernet NIC 206 which performs Ethernet physical and MAC layer functions, an Ethernet jack 207 such as RJ-45 socket coupled to the Ethernet NIC for connecting the sniffer device to wired LAN with optional power over Ethernet or POE, and a serial port 208 which can be used to flash/configure/troubleshoot the sniffer device. A power input 209 is also provided. One or more light emitting diodes (LEDs) 210 can be provided on the sniffer device to convey visual indications (such as device working properly, error condition, undesirable wireless activity alert, and so on).

In an embodiment, sniffer 122 can be built using a hardware platform similar to that used to build an AP, although having different functionality and software. In an embodiment, both the sniffer and the AP functionality can be provided in the same hardware platform. In an alternative embodiment, the sniffer functionality is provided using software that is run on one or more computers (e.g., laptop computers, desktop computers etc.) in the wireless network.

One or more data collection servers 124 can be connected to the LAN connection ports 125. Each sniffer can convey information about the detected wireless transmission to data collection server for analysis, storage, processing, and rendering. The sniffer may filter and/or summarize the information before conveying it to the data collection server. The sniffer receives configuration information from the data collection server. It may also receive specific instructions form the server as regards tuning to specific radio channel, detecting transmission of specific packet on the radio channel etc. In a preferred embodiment, the sniffer connects to the data collection server over the LAN through the wired connection port. In an alternate embodiment, the sniffer connects to the data collection server over the LAN through the wireless connection. In an alternative embodiment, the sniffer can operate in a standalone fashion, e.g., without requiring interaction with the data collection server for intrusion detection and other operational functions.

Figure 3:
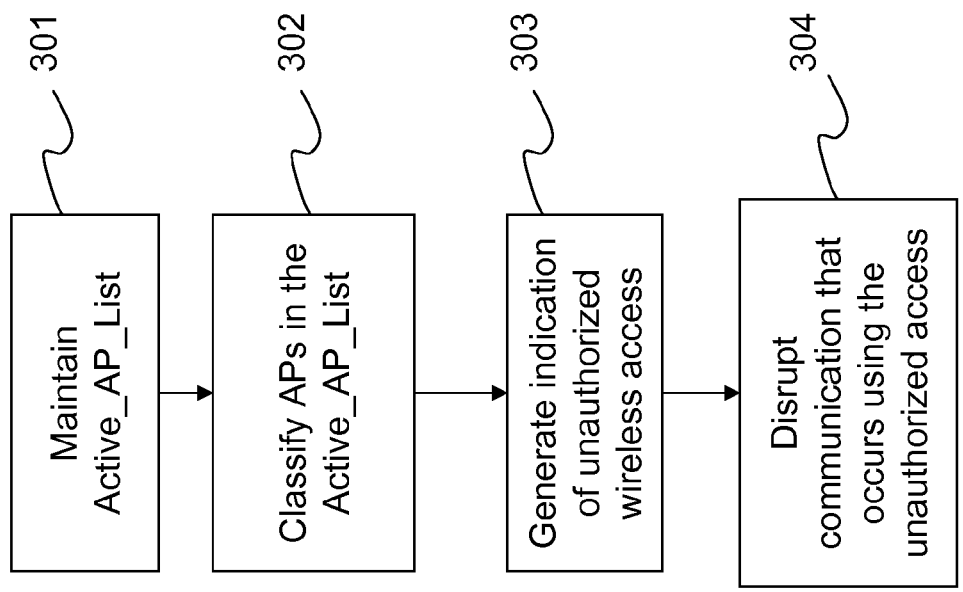
FIG. 3 shows an exemplary logical flow of steps for intrusion detection and prevention according to an embodiment of the present invention.
Figure 4:
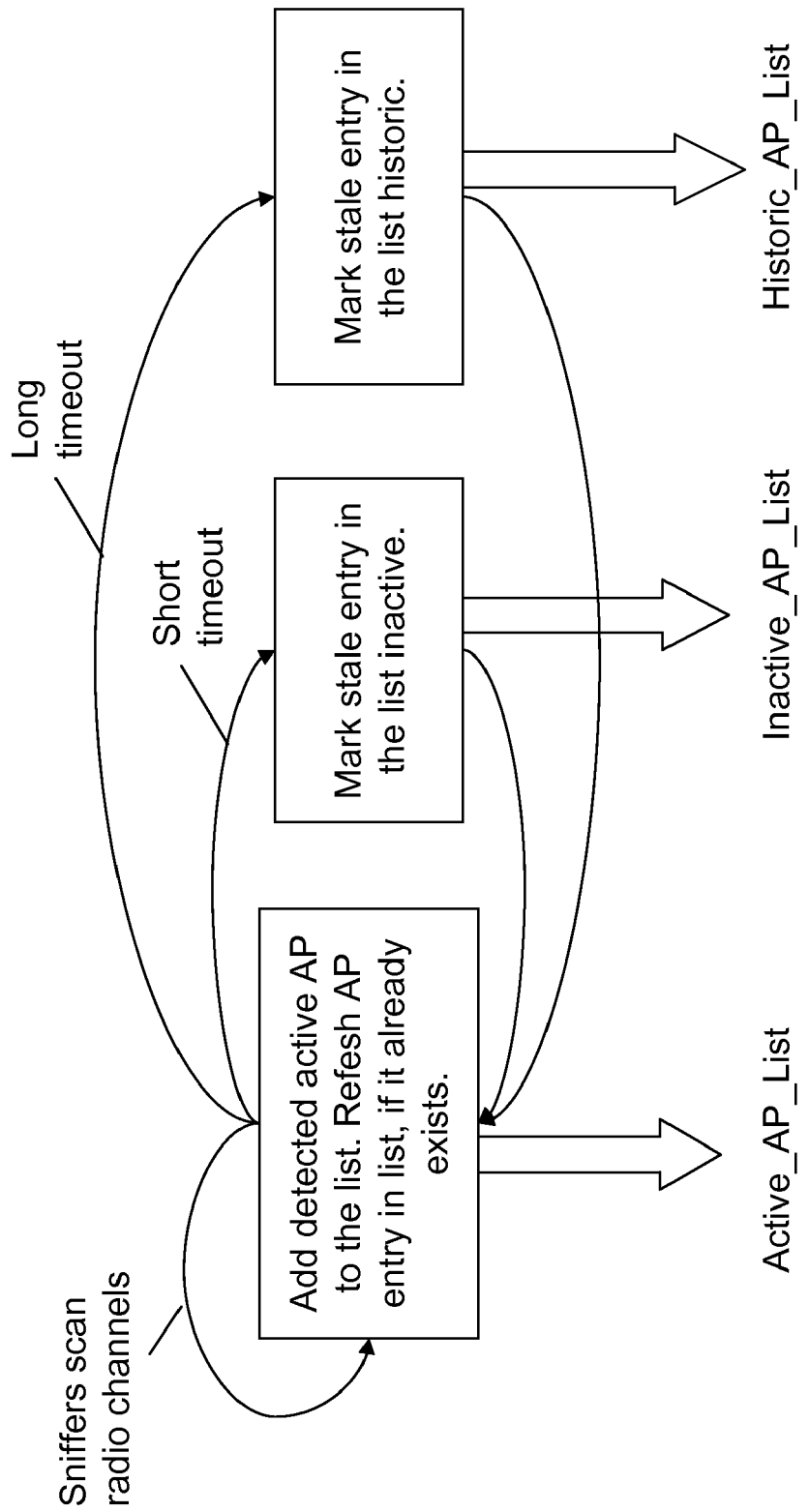
FIG. 4 shows a simplified logical state diagram for maintaining list of active APs according to an embodiment of the present invention.

In an embodiment, the wireless intrusion detection process (e.g., for detecting unauthorized wireless access) can be provided using sniffer devices. FIG. 3 shows the logical flow of steps for the wireless intrusion detection according to this embodiment of the invention. This diagram is merely an example, which should not unduly limit the scope of the claims herein. One of ordinary skill in the art would recognize other variations, modifications, and alternatives. As shown, the first step 301 is to maintain the list of active APs called the Active_AP_List. An active AP is defined as the AP that was recently involved in the wireless transmission as the sender or the receiver. An active AP can be detected by analyzing the wireless transmission on the radio channel captured by the sniffer. For example, every AP in the WiFi network periodically transmits a beacon packet for the client wireless stations to be able to connect to it. The beacon packet contains information such as clock synchronization data, AP's wireless MAC address (Basic Service Set Identifier (BSSID)), supported data rates, service set identifiers (SSIDs), parameters for the contention and contention-free access to the wireless medium, capabilities as regards QoS, security policy etc. In an embodiment, detection of beacon packet transmission from an AP is used to identify said AP to be an active AP. Beacon packet can be recognized from the type and subtype fields in the 802.11 MAC header of the beacon packet. In alternative embodiments, active AP can also be detected when any other wireless transmission (data, control or management packet) directed to or generating from it is observed by the sniffer. In yet a further alternative embodiment, identify of the active AP is received from other network systems. Whenever an active AP is detected (i.e., wirelessly active AP), it is added to the Active_AP_List. If the Active_AP_List already contains entry for said AP, the corresponding entry is refreshed. Associated with each entry in the Active_AP_List are a short timeout and a long timeout values. After a short timeout, the corresponding entry is marked "inactive" and after a long timeout it is marked "historic". The logical flow of steps for maintaining the Active_AP_List is shown in FIG. 4. This diagram is merely an example, which should not unduly limit the scope of the claims herein. One of ordinary skill in the art would recognize other variations, modifications, and alternatives.

The second step 302 is to classify the APs in Active_AP_List into: a) Authorized APs, b) Unauthorized APs, and c) External APs. In this embodiment, the Authorized APs are the APs which are allowed to be connected to the LAN by the network administrator. The Unauthorized APs are the APs that are not allowed to be connected to the LAN, but are still connected to the LAN. The Unauthorized APs pose a security threat as they can provide a way for intruders to wirelessly access the LAN resources. The External APs are the APs whose presence can be detected by the sniffers but they are not connected to the LAN. For example, these can be neighbor's APs whose radio coverage spills into the region of operation of the LAN. The external APs may not pose a security threat as they do not provide a way for intruders to access the LAN.

The third step 303 can generate an indication of unauthorized wireless access (e.g., intrusion alert) if an Unauthorized AP is identified in step 302. Once the intrusion alert is generated, the method sends an indication of the Unauthorized AP and/or intruding wireless station to a prevention process. Depending upon the embodiment, the method sends the indication via an inter process signal between various processes, which can be provided in computer codes. Alternatively, the method performs a selected function within the same process code to implement the prevention process. Further details of the prevention process can be found throughout the present specification and more particularly below.

At step 304 certain action can be performed to disable or disrupt any communication between the Unauthorized AP and the intruding wireless station. One embodiment of this step works by preventing or breaking the "association" between the Unauthorized AP and the intruding wireless station. Association is certain procedure according to the IEEE 802.11 MAC protocol wherein the wireless station and the AP establish a wireless connection between them. Techniques for preventing or breaking the association between the Unauthorized AP and the intruding wireless station include but are not limited to sending one or more spoofed "deauthentication" packets from one or more sniffers with the Unauthorized AP's wireless MAC address as source address with a reason code "Authentication Expired" to the intruding wireless station or to a broadcast address, sending one or more spoofed deuthentication packets from one or more sniffers to the Unauthorized AP with the intruding wireless station's wireless MAC address as source address with reason code "Auth Leave", sending one or more spoofed "disassociation" packets from one or more sniffers with the Unauthorized AP's wireless MAC address as source address to the intruding wireless station or to a broadcast address, and sending one or more spoofed disassociation packets from one or more sniffers to the Unauthorized AP with the wireless station's wireless MAC address as source address.

In the preferred embodiment of the method of invention, step 302 can distinguish the APs that are connected to the LAN from those that are not connected to the LAN. This advantageously facilitates distinguishing between the Unauthorized APs and the External APs. The distinguishing between the Unauthorized APs and the External APs LAN according to the present invention offers several benefits and/or advantages. For example, the distinguishing between the Unauthorized APs and the External APs can facilitate initiating intrusion prevention of step 304 in an automated fashion as the distinguishing as above can provide for avoiding disrupting neighbor's wireless network via intrusion prevention. As another example, the distinguishing between the Unauthorized APs and the External APs can provide for avoiding false alarms on intrusion. In a typical office environment, the sniffer can typically detect wireless communication associated with several APs other than the Authorized APs. Among these several APs other than the Authorized APs, some APs can be the External APs (e.g., APs in neighbor's wireless network, municipal WiFi APs etc.) and the others can be the Unauthorized APs (e.g., AP connected by unassuming or malicious employee to the LAN for providing unauthorized access to the LAN). With the ability to distinguish between the External APs and the Unauthorized APs, the security system can avoid raising intrusion alarms for External APs. This takes nuisance factor out of system operation as well as saves resources that would otherwise be wasted in chasing false intrusion alarms. Yet another benefit and/or advantage offered by the distinguishing between the Unauthorized APs and the External APs LAN according to the method of present invention is robustness against certain spoofing attacks. This is described throughout the present invention and more particularly below.

Figure 5:
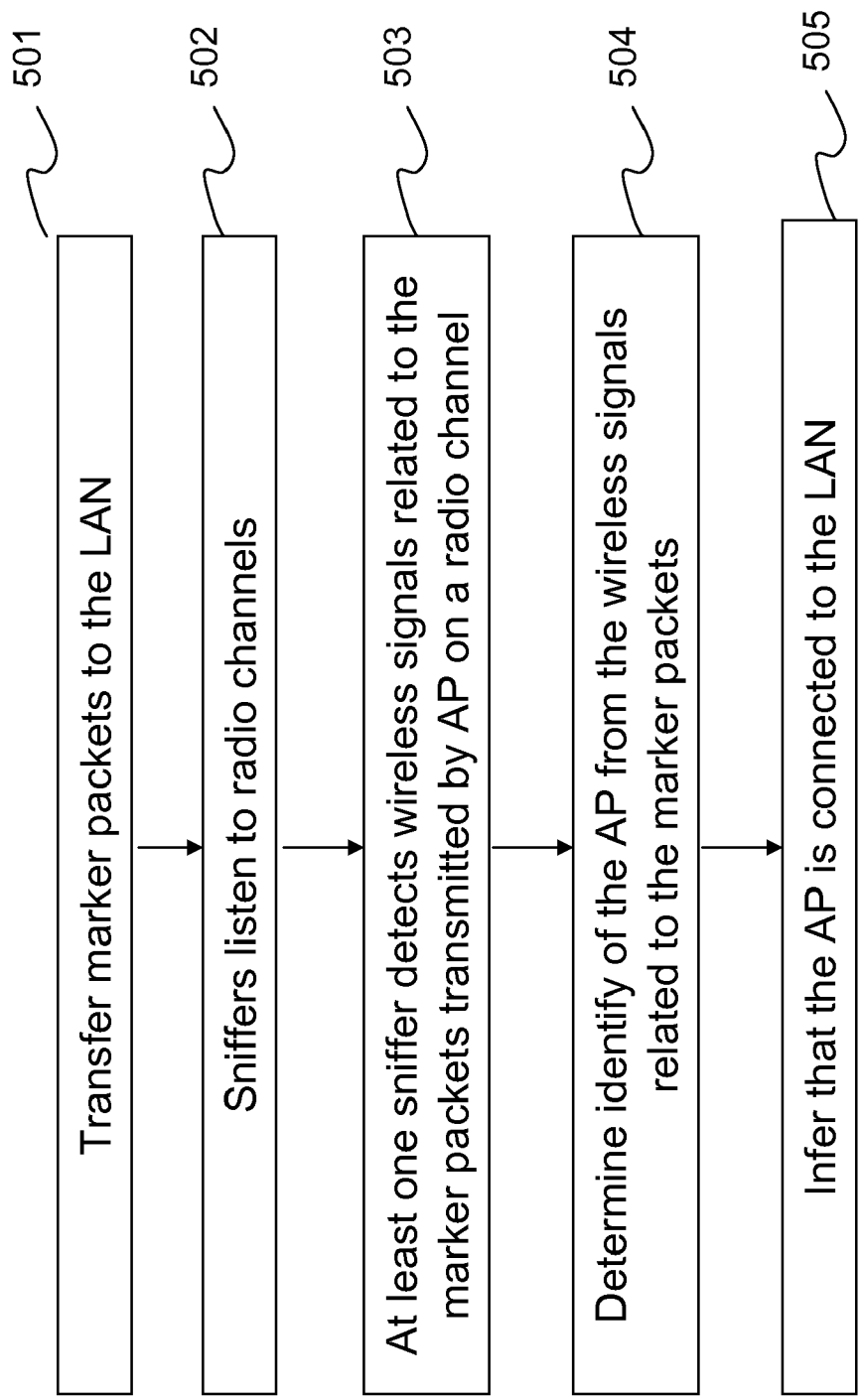
FIG. 5 shows an exemplary logical flow of steps for determining if a wirelessly active AP is connected to the LAN according to an embodiment of the present invention.

The logical flow of steps according to a method according to the present invention for determining if a wirelessly active AP detected by the sniffer is connected to the LAN is shown in FIG. 5. This diagram is merely an example, which should not unduly limit the scope of the claims herein. One of ordinary skill in the art would recognize other variations, modifications, and alternatives.

As shown in step 501, one or more marker packets are transferred to the LAN from the originating device. The originating device can be a sniffer, a data collection server, a switch, a router, or any computer system which is coupled to the LAN. For example, the sniffer or the data collection server can transfer the marker packets to the concerned LAN via the Ethernet port. The marker packets have a peculiar format using which they can be identified by the intrusion detection system. The format can be different for different marker packets. The format can comprise bit patterns, source addresses, destination addresses, packet sizes, values for selected fields in the packets, and/or combinations thereof. The format may be associated with a collection of marker packets. The marker packets may contain sequence number identifiers.

The marker packet is received by at least one AP connected to the LAN and outputted by the AP on the wireless medium. Typically the AP performs certain transformation on the marker packet before outputting it. For example, the marker packet as received on the wired interface of the AP may be in accordance with the wired Ethernet protocol. The AP can convert the marker packet to the 802.11 frame for outputting it on the wireless medium. The AP may encrypt at least a portion of the marker packet received on its wired interface before outputting the marker packet on the wireless medium. Preferably at least a portion of the format information in the marker packets is unaffected by such conversion or transformation.

In step 502, one or more sniffers listen to one or more radio channels (wireless medium) on which wireless communication can take place.

In step 503, at least one sniffer among the one or more sniffers detects at least one frame related to a marker packet on the radio channel. Such a frame is identified by comparing the format of the frames captured by the sniffer with the format associated with the marker packets.

In step 504, the identity of the AP that outputs the frames related to the marker packets on the radio channel is determined from the 802.11 MAC header (for example from the transmitter address field or BSSID field) of the frames outputted on the radio channel. The identity can comprise a wireless MAC address (e.g., MAC address of a wireless interface) of the AP.

In step 505, the identified AP is inferred to be connected to the LAN. In a preferred embodiment, the corresponding entry in the Active_AP_List is marked as "connected to the LAN". Moreover, if the identified AP is not among the Authorized APs, it is inferred to be an Unauthorized AP which can provide a way for intruders to access the LAN and intrusion alert is generated. To facilitate the inference that the indentified AP is not among the Authorized APs, in an embodiment, a list of Authorized APs (e.g., in the form of MAC addresses of their wireless interfaces) can provided to the system. Preferably, when the Unauthorized AP is detected, automated intrusion prevention as in step 304 is also triggered.

In an embodiment of the above method, the marker packet can be an Ethernet style packet addressed to the broadcast address, i.e., the value of hexadecimal ff:ff:ff:ff:ff:ff in the destination address field of the Ethernet frame header. The source address can be an address of the network interface of the originating device. For example, if the sniffer transfers marker packets to the LAN, the source address in the Ethernet frame header can be the MAC address of the wired network interface of the sniffer. The source address value can constitute format information associated with the marker packets. In an embodiment, a sniffer in the security monitoring system is provided with information about the MAC addresses of the wired network interfaces of other sniffers in the security monitoring system. A marker packet transferred by the sniffer will be received by all APs that are connected in the LAN broadcast domain. For example, if the marker packet is transferred to a selected VLAN (virtual local area network) segment if the LAN, it can be received by all APs which are connected to the selected VLAN. Certain APs among these acting as layer 2 bridges then output this broadcast packet on the wireless medium, e.g., after translating it to the 802.11 style packet (also called as 802.11 frame). The frames related to the marker packets among the frames captured on the wireless medium can be identified via the source address in their 802.11 MAC headers. For example, if the source address in the 802.11 MAC header of a frame captured over the wireless medium matches the MAC address of the wired network interface of the sniffer that transferred the marker packets to the LAN, the captured frame can be identified as being related to the marker packet. In an alternative embodiment of the above method, the marker packet can be an Ethernet style packet addressed to the multicast address, i.e., the value in the destination address field of the Ethernet frame header can be a multicast address.

In an alternative embodiment, the marker packet can be an Ethernet style unicast packet addressed to the MAC address of a wireless station associated with an AP. The MAC address of the wireless station is inferred by analyzing the prior communication between the wireless station and the AP that is captured by one or more sniffers. This packet will be received by the AP if it is connected to the LAN. The AP acting as layer 2 bridge then transmits the marker packet on the wireless medium after translating it to the 802.11 style frame.

In an alternative embodiment, the marker packet is an IP packet addressed to the IP address of a wireless station associated with an AP. The IP address is inferred by analyzing the prior communication between the wireless station and the AP that is captured by one or more sniffers. This packet will be received by the AP if it is connected to the LAN and transmitted by the AP on the wireless medium after translating it to the 802.11 style frame. In yet an alternate embodiment, the marker packet is an IP packet addressed to the broadcast IP address of the LAN.

In an embodiment, the marker packet is not actively injected in the LAN by the intrusion detection system. Rather, one or more broadcast/multicast/unicast packets from the data traffic on the LAN are used as marker packets. The logic being if an AP is connected to the same LAN as the sniffer, then at least a subset of the traffic seen by the wired Ethernet port of the sniffer will be related to the traffic captured by the sniffer on the radio channel. Thus the sniffer compares the packets captured on the radio channels with the packets flowing over the wired LAN and captured by the sniffer's LAN connection port (Ethernet NIC) to identify correlation between them.

The sniffer can detect transmission of frame related to the marker packet on a specific radio channel if the sniffer is tuned to the radio channel during the interval of transmission of the marker packet on the radio channel. It may thus be necessary to send marker packets in the LAN periodically and optionally at randomized intervals, so as to maximize the probability that at least one sniffer gets an opportunity to detect at least one frame related to marker packet transmitted by the AP connected to the LAN.

Figure 6A:
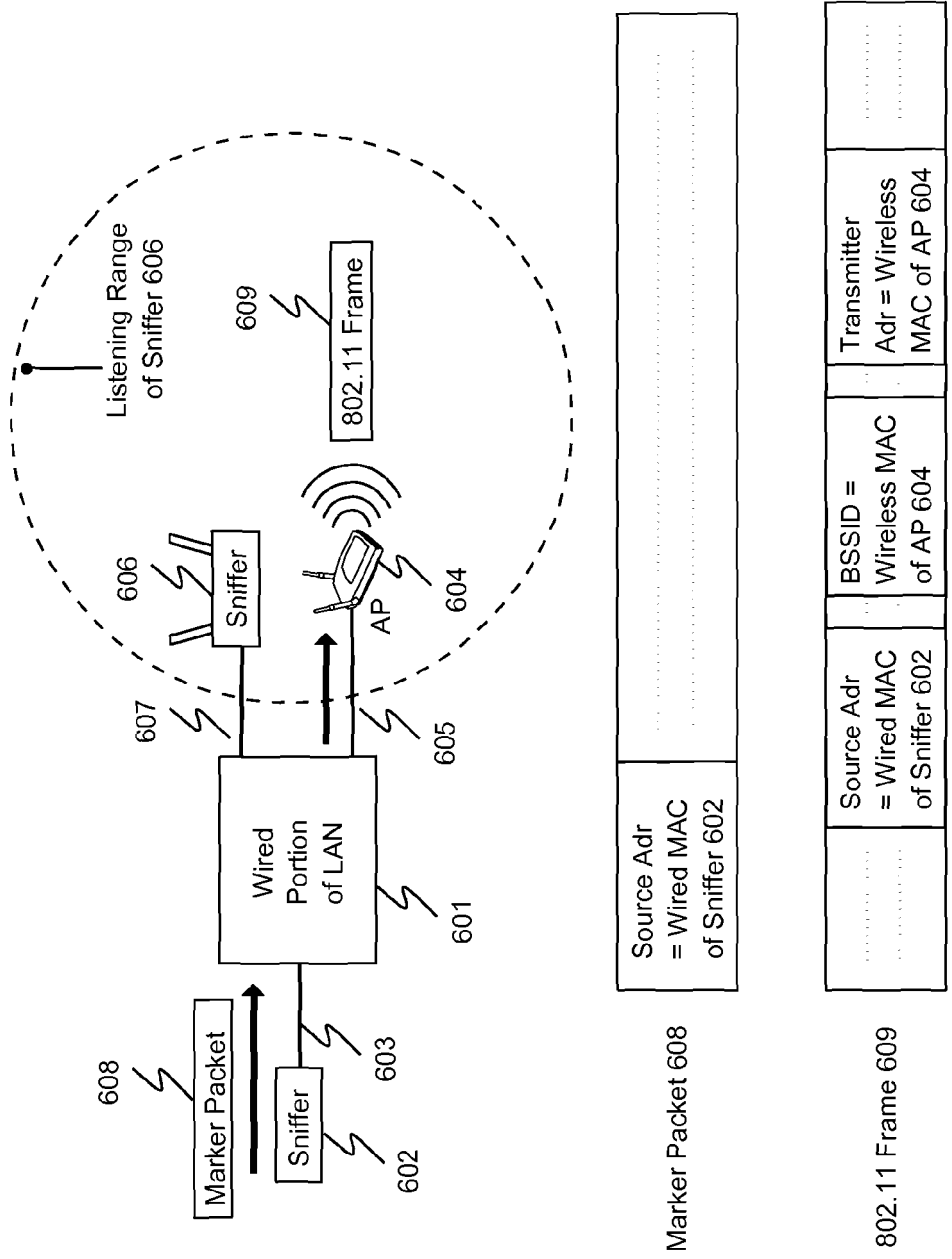
FIG. 6A shows a schematic of operation of the process of FIG. 5 according to an embodiment of the present invention.

An exemplary schematic of operation of the method according to an embodiment of the present invention is shown in FIG. 6A. This diagram is merely an example, which should not unduly limit the scope of the claims herein. As shown in the figure, a sniffer 602 is connected to a wired portion 601 of the LAN using the Ethernet connection 603. An AP 604 is connected to the wired portion of the LAN using the Ethernet connection 605. Another sniffer 606 is also connected to the wired portion of the LAN using the Ethernet connection 607.

As also shown, the sniffer 602 transfers a marker packet 608 to the wired portion of the LAN. The source address field of the marker packet includes the MAC address of the Ethernet interface of the sniffer 602. Preferably, this MAC address is known to other sniffers in the security monitoring system. The marker packet is received by the AP 604 through the Ethernet connection 605 and is outputted by the AP as an 802.11 style frame 609 on the wireless medium. The sniffer 606 detects the 802.11 frame 609 associated with the marker packet on the wireless medium. The sniffer 606 can use source address information in the captured 802.11 frame to identify that the frame is associated with the marker packet. Moreover, the sniffer 606 can use the transmitter address or BSSID information in the captured 802.11 frame 609 to identify the AP which outputs the marker packet on the wireless medium.

Figure 6B:
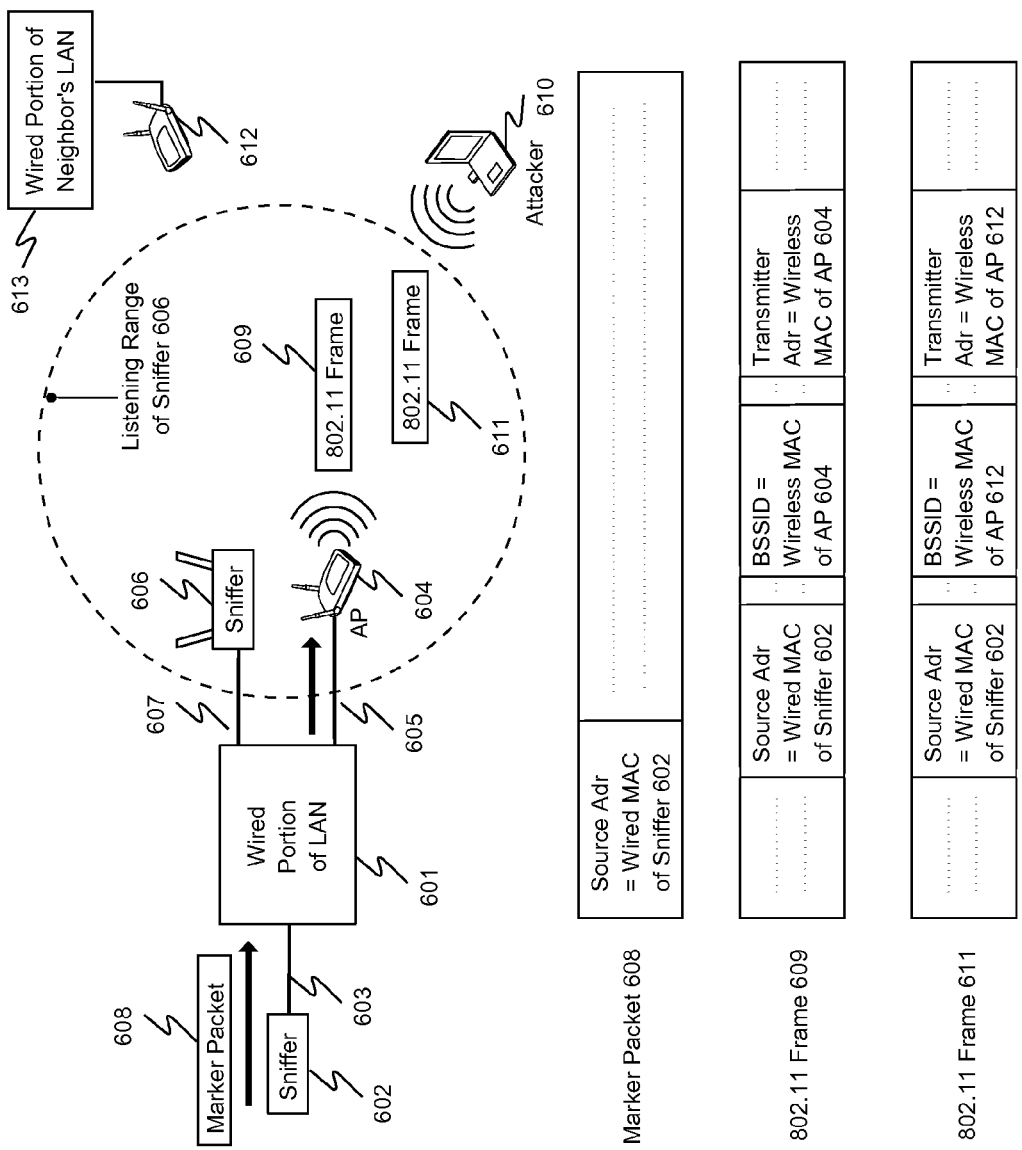
FIG. 6B shows a schematic of operation of an attack on the process of FIG. 5 according to an embodiment of the present invention.

An exemplary schematic of operation of an attack on the method according to an embodiment of the present invention is shown in FIG. 6B. This diagram is merely an example, which should not unduly limit the scope of the claims herein. As shown, an attacker 610 can disrupt the operation of the method. For example, the attacker can make the security monitoring system into erroneously thinking that the neighboring APs are connected to the LAN that the security monitoring system is supposed to protect. Such falsification can result into the security monitoring system accidentally disrupting the neighboring APs, e.g., via an automatic prevention process as described in step 304 above and throughout the present invention. The falsification can also result into the security system generating Unauthorized AP alert, when the neighboring AP in fact does not provide a way for intruders to access the LAN that is protected by the security system. Such operation is undesirable.

As merely an example, the attacker 610 can transmit 802.11 style frame 611 in the wireless medium. This frame can include in the source address field of the 802.11 MAC header the MAC address of the Ethernet interface of the sniffer 602. In an embodiment, this MAC address may be learned by the attacker 610 by observing 802.11 style frame 609 related to marker packet 608 that is outputted by the AP 604 over the wireless medium. In alternative embodiment, this MAC address may be learned by the attacker via other means. Moreover, the frame 611 can include a wireless MAC address of AP 612 in the transmitter address and/or BSSID fields. Notably, the AP 612 is not connected to the wired portion of the LAN (601) that is being monitored for the unauthorized wireless access. The AP 612 can be an AP that co-exists in the wireless medium. The AP 612 can be connected to the wired portion 613 of the neighbor's LAN. For example, the AP 612 can be an AP in the nearby coffee shop, in the neighbor's office, in the municipal WiFi network etc. The sniffer 606 may detect (capture) the frame 611 on the radio channel. The sniffer may identify the frame 611 as related to the marker packet (e.g., marker packet 608) due to the presence of MAC address of the wired interface of the sniffer 602 in the source address field of the captured frame, i.e., presence of matching format. Moreover, the sniffer may interpret that the frame 611 is outputted by the AP 612 on the wireless medium due to the presence of the wireless MAC address of the AP 612 in the transmitter address and/or BSSID field on the frame 611. This may result in false inference that the AP 612 is connected to the wired portion 601 of the LAN. The attacker 610 is referred herein as a spoofing attacker as it spoofs the 802.11 style frames, e.g., transmits them as if they came from the wired interface of the sniffer 602 and as if they were transmitted by the AP 612 on the wireless medium when in fact they were not.

Figure 7A:
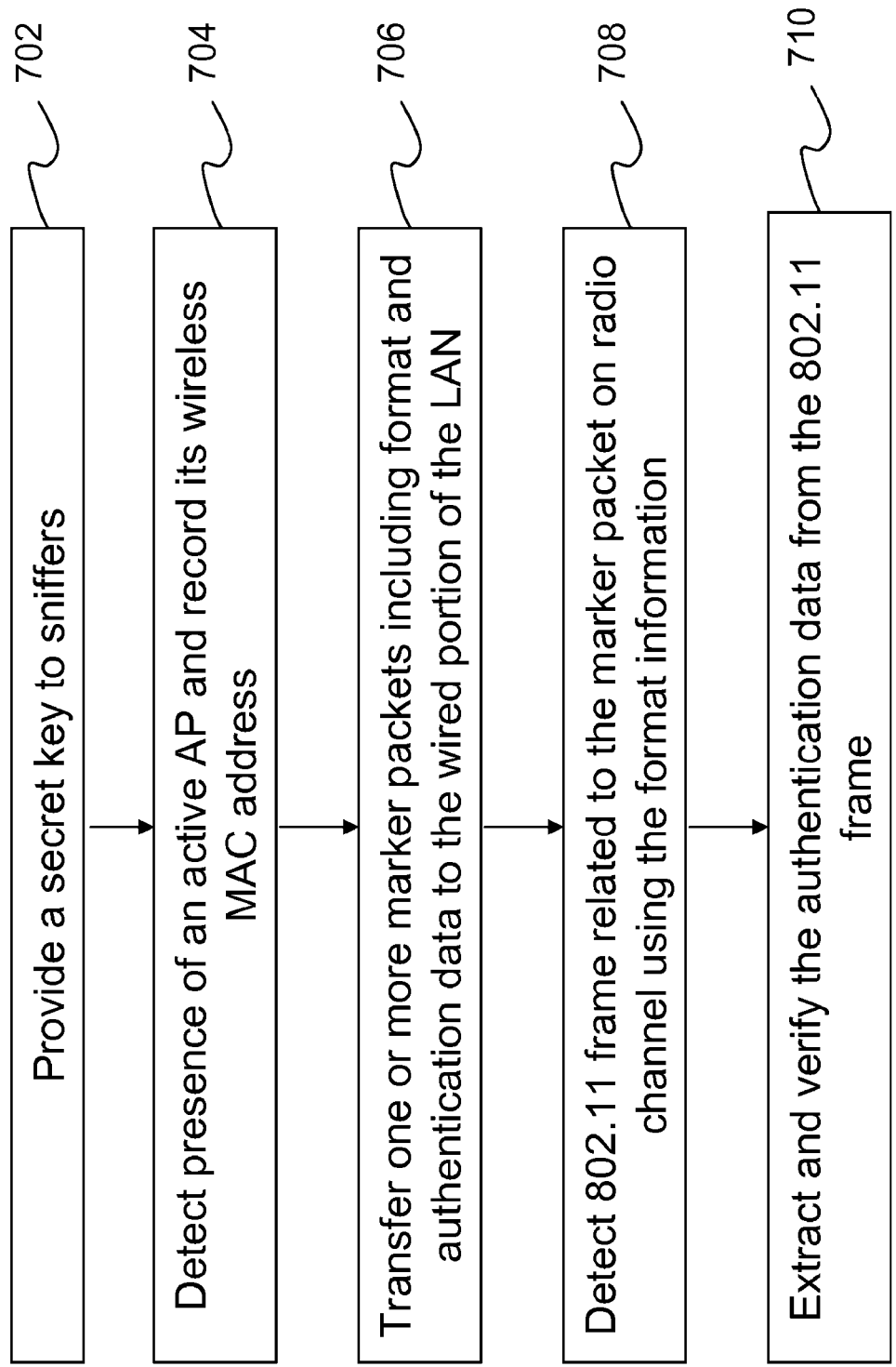
FIG. 7A shows an exemplary logical flow of steps for determining if a wirelessly active AP is connected to the LAN according to an alternative embodiment of the present invention.
Figure 7B:
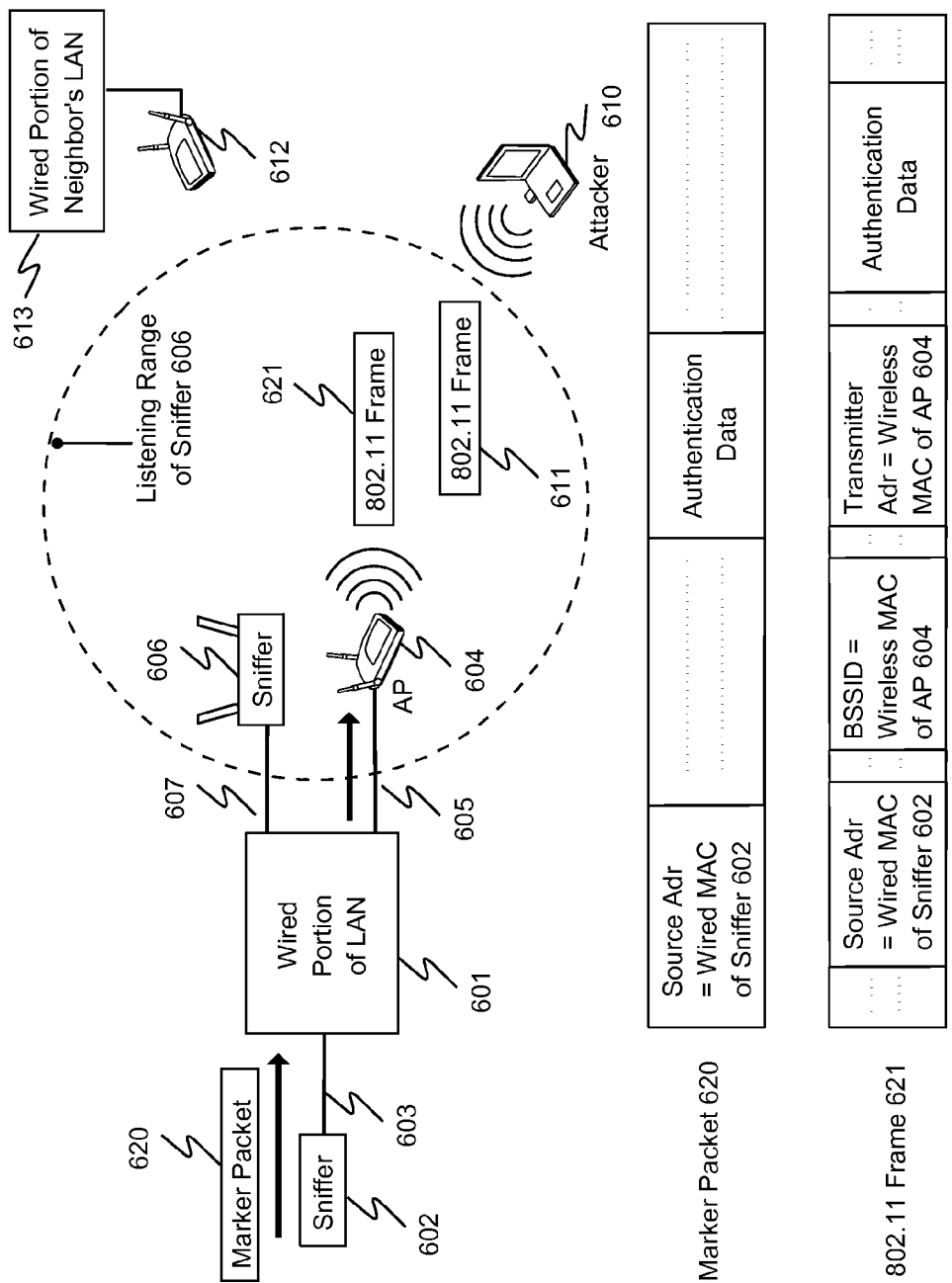
FIG. 7B shows a schematic of operation of the process of FIG. 7A according to an embodiment of the present invention.

Advantageously, the present invention can defeat the attacker 610. A method according to an alternative embodiment of the present invention for determining if a wirelessly active AP detected by the sniffer is connected to the LAN in the presence of a spoofing attacker is shown in FIG. 7A and an exemplary schematic of operation of this method is shown in FIG. 7B. These diagrams are merely examples, which should not unduly limit the scope of the claims herein. One of ordinary skill in the art would recognize other variations, modifications, and alternatives.

At step 702, a secret key is provided to the security monitoring system. As merely an example, the secret key can include a password. As another example, the secret key can include a digital certificate. Preferably, the secret key can be stored in the system memory so that it is accessible to the sniffers 602 and 606. In an embodiment, the secret key is distributed by the server 124 to the sniffers 122, e.g., over the computer network. Preferably, the secret key is changed periodically.

At step 704, the sniffer 606 can detect the presence of active AP 604 and record its wireless MAC address. For example, the sniffer 606 detects a beacon frame transmitted from the AP 604 and including a wireless MAC address of the AP 604 in the BSSID field of the beacon frame. Alternatively, the sniffer 606 detects a frame transmitted from the AP to the station (e.g., with the TO DS and FROM DS bit fields in the frame set to 0 and 1, respectively) and including the wireless MAC address of the AP 604 as the transmitter address in the frame. Yet an alternatively, the sniffer 606 detects a frame transmitted from the station to the AP (e.g., TO DS and FROM DS bit fields in the frame set to 1 and 0, respectively) and including the wireless MAC address of the AP 604 as the receiver address in the frame. Alternatively, identity of the active AP 604 is detected by other systems in the local area network and is communicated to the security monitoring system.

In an embodiment, identify of the wirelessly active AP 604 (e.g., its wireless MAC address) detected by the sniffer 606 is communicated to the server 124, and subsequently, by the server 124 to the sniffer 602.

At step 706, the sniffer 602 transfers a marker packet 620 to the wired portion of the LAN. The source address field of the marker packet includes the MAC address of the Ethernet interface of the sniffer 602. This address can be used as format information. Moreover, the sniffer also includes authentication data in the marker packet 620. In a preferred embodiment, the authentication data can include a cryptographic hash value (or a value derived from the cryptographic hash value) of data block including information associated with at least the wireless MAC address of the AP 604 and the secret key.

A cryptographic hashing function is a transformation that takes a block of data as input and returns a fixed-size string, which is called the hash value. The hash value can be thought of as a "digital fingerprint" of the input data block. Well known cryptographic hashing functions include MD5 (Message Digest algorithm 5), SHA-1 (Secure Hash Algorithm version 1), SHA-2, HMAC (Hash Message Authentication Code) etc. In the embodiment of the present invention, input data block to the cryptographic hashing function includes data containing information associated with at least the wireless MAC address of the active AP which needs to be tested for connectivity to the wired portion of the LAN and the secret key.

The marker packet 620 is received by the AP 604 through the Ethernet connection 605 and is outputted by the AP as an 802.11 style frame 621 on the wireless medium.

At step 708, the sniffer 606 detects the 802.11 frame 621 on the radio channel. In an embodiment, the sniffer 606 can identify the frame 621 to be associated with the marker packet (e.g., marker packet 620) based upon the source MAC address in the frame being that of the MAC address of the wired interface of the sniffer 602. Moreover, the sniffer 606 can identify the AP outputting the frame 621 based upon the transmitter address and/or the BSSID fields in the frame 621.

Moreover, at step 710, the sniffer 606 can extract and verify the authentication data included in the marker packet by the sniffer 602 from the captured frame 621. In an embodiment, the sniffer 606 computes a hash value using similar algorithm used by the sniffer 602. That is, the sniffer 606 can compute a hash value using the cryptographic hashing function over an input data comprising information associated with the wireless MAC address of the AP (which is derived from the transmitter address and/or the BSSID fields of the frame 621 at step 708) and the secret key (which is provided at step 702). The computed hash value is compared with the hash value included in the authentication data extracted from the frame 621 for verification.

Since the frame 621 is associated with the legitimate marker packet (e.g., marker packet 620), a match would be found between the hash value computed by the sniffer 606 and the hash value included in the authentication data extracted from the frame 621.

On the other hand, if the captured frame were an 802.11 style frame transmitted by the spoofing attacker (e.g., frame 611 transmitted by attacker 610), the match would not be found in a preferred embodiment. The reason being that the attacker may not have the knowledge of the secret key (e.g., the secret key of step 702) and thus may not be able to include authentication data in the frame 611 that would pass the authentication check performed by the sniffer 606 as in step 710. The method of the present invention thus provides protection against the spoofing attackers.

Depending upon embodiments, the authentication data (e.g., the authentication data including the cryptographic hash value) can be included in the marker packet in variety of ways. In an embodiment, it is included in the payload of the Ethernet frame associated with the marker packet 620. When the AP 604 outputs this frame as 802.11 style frame 621, this authentication data is contained in the payload of the 802.11 style frame 621.

In an alternative embodiment, the payload of the Ethernet frame associated with the marker packet may be encrypted by the AP 604 (e.g., using encryption techniques such as WEP, TKIP, Advanced Encryption Standard (AES) etc.) while outputting the Ethernet frame on the wireless medium as the 802.11 style frame. The payload thus may not be discernible for the sniffer 606 which captures the 802.11 style frame on the wireless medium and thus it may not be able to verify the authentication data as required in step 710 of the method. In this embodiment, the authentication data can instead or in addition to be included within the destination address of the Ethernet frame. Upon transformation to the 802.11 frame, irrespective of whether the payload is encrypted or not, the destination address remains unchanged and unencrypted in this embodiment.

In a specific embodiment, the marker packet 620 includes as destination address a multicast address. Certain Ethernet multicast addresses are in a range from 01:00:5e:00:00:01 to 01:00:5e:7f:ff:ff. The authentication data can be included as a part of variable part of the multicast address structure, e.g., three least significant octets (bytes) of the multicast address. Specifically, a hash value computed by the sniffer 602, a portion of the hash value computed by the sniffer 602, or another value derived from the hash value computed by the sniffer 602 can be included in the least significant octets of the multicast address. As merely an example, if the hash value computed is 02:e4:92:99:a4:bb:67:89, the marker packet 620 can be sent to multicast address 01:00:5e:02:e4:92, wherein the three most significant octets of the hash value are included as the three least significant octets of the multicast address.

Yet alternatively, the hash value or another value derived from the hash value can be included within portion of the source address in the Ethernet frame associated with the marker packet 620.

In yet a further alternative embodiment, the same portion of information within the marker packet can indicate both the format information and the authentication data. For example, the format information can comprise the destination address in the marker packet being from a predetermined subset of the multicast addresses. The authentication data can comprise a hash value. The destination address can then be an address selected from the predetermined subset which is related to (e.g., numerically closest to a portion of, numerically farthest to a portion of etc.) the computed hash value.

In a further alternative embodiment, the format information is intrinsically associated with the authentication data. For example, if the authentication data can be verified to be legitimate, at least two inferences can be drawn. The first being that the frame containing the authentication data is related to the marker packet and the second being that the frame is related to the legitimate marker packet. Other alternatives for including the format information and/or the authentication data within the marker packets are possible and will be apparent to those with ordinary skill in the art based on the teachings of the present specification.

In an embodiment, the wired portion 601 of the LAN comprises a plurality of sub-portions. As merely an example, a sub-portion can be a subnetwork (e.g., Internet protocol subnetwork), a VLAN (Virtual Local Area Network) etc. At least one marker packet originating device can be connected to each of the sub-portions. For example, the Ethernet connection 603 can be an access port connection on a switch. The access port connection typically is associated with a single VLAN or subnetwork. The sniffer 602 connected into the access port corresponding to the Ethernet connection 603 can thus transfer marker packets to the VLAN or the subnetwork associated with the access port. Marker packets can be transferred to other subnetworks or VLANs in the wired portion 601 by other sniffers.

In an alternative embodiment, the Ethernet connection 603 can be a trunk port connection on a switch. The trunk port typically is associated with a plurality of VLANs or subnetworks. The sniffer 602 connected into the trunk port corresponding to the Ethernet connection 603 can thus transfer marker packets to the plurality of VLANs or the subnetworks associated with the trunk port.

In yet an alternative embodiment, a software module can be provided on a switch on a router which can transfer marker packets to the selected VLANs or subnetworks that traverse the switch.

In an embodiment, marker packets not comprising authentication data computed based upon wireless side identity of the AP and the secret key are transferred by the sniffer 602 to the wired portion 601. In this embodiment, if the sniffer 606 detects a wireless frame related to the marker packet not comprising the authentication data being transmitted by any wirelessly active AP, that wirelessly active AP is inferred to be connected to the wired portion 601, pending confirmation that the spoofing attacker is not operational against that wirelessly active AP. To confirm that the spoofing attacker is not so operational, the marker packets comprising authentication data computed based upon the wireless side identity of that wirelessly active AP and the secret key are transferred by the sniffer 602 to the wired portion 601. If the sniffer 606 can detect a wireless frame related to the marker packet comprising the authentication data and if it can verify that authentication data, then that wirelessly active AP is confirmed to be connected to the wired portion of the LAN. The two stage process as in this embodiment can provide more efficient operation by reducing the number of marker packets transferred to the LAN. This is because, the marker packets containing authentication data are adapted to test connectivity of a selected one or more APs as the authentication data therein is computed based upon the wireless side identities of those AP, whereas the marker packets not containing the authentication data are not so restricted. This embodiment thus uses targeted marker packets only as needed.

As described herein the present invention provides method for determining if a wirelessly active AP is connected to the LAN to facilitate detecting and optionally blocking unauthorized wireless access to the LAN. The method further facilitates avoiding false alarms on intrusion due to neighboring harmless wireless activity. Moreover, the method provides resistance to spoofing attackers. The method of present invention can be implemented using one or more sniffers 122. The various steps in the method can be performed by sniffers 122. In an alternative embodiment, a subset of the steps can be performed by the server 124.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for removing false alarms resulting from spoofing, in detecting access point devices that provide unauthorized wireless access to local area computer networks, the method comprising:

installing a wireless intrusion monitoring system in a geographic region, the geographic region including a wired portion of a local area network, the wireless intrusion monitoring system being configured to:

detect a plurality of wireless access points (APs) whose radio coverage intersects with the selected geographic region; and classify the plurality of the APs into at least one or more unauthorized APs from the plurality of APs that are inferred as connected to the wired portion of the local area network and one or more external APs from the plurality of APs that are inferred as not connected to the wired portion of the local area network;

detecting a wirelessly active access point (AP1) whose radio coverage intersects with the geographic region, wherein the AP1 is connected to the wired portion of the local area network;

determining a first basic service set identifier (BSSID1) which identifies the AP1;

transferring one or more marker packets to the wired portion of the local area network, the one or more marker packets:

including an authentication information which is a predetermined function of at least the BSSID1, including a format information, and being structured to be received from the wired portion of the local area network by at least a subset of access points connected to the wired portion of the local area network and to be outputted as first one or more wireless frames by the at least the subset of the access points while maintaining the authentication information and the format information in the outputted one or more wireless frames;

receiving at least a subset of the first one or more wireless frames, wherein the at least the subset of the first one or more wireless frames include the BSSID1;

ascertaining that the at least the subset of the first one or more wireless frames include the authentication information;

inferring that the AP1 is connected to the wired portion of the local area network;

receiving second one or more wireless frames, the second one or more wireless frames including a second basic service set identifier (BSSID2) different from the BSSID1, wherein the second one or more wireless frames:

being transmitted during a spoofing attack process, and imitating the format information to make an access point identified with the BSSID2 (AP2), which is not connected to the wired portion of the local area network, falsely inferred as connected to the wired portion of the local area network in the wireless intrusion monitoring system to generate a false alarm on unauthorized access to the wired portion of the local are network;

ascertaining that the second one or more wireless frames are devoid of an authentication information which is the predetermined function of at least the BSSID2; and inferring that the second one or more wireless frames do not indicate that the AP2 is connected to the wired portion of the local area network.

2. The method of claim 1 wherein the predetermined function is a hash function.

3. The method of claim 1 wherein the predetermined function is a cryptographic hash function.

4. The method of claim 1 wherein the AP2 being an access point within a neighborhood of the geographic region and not connected to the wired portion of the local area network.

5. The method of claim 1, wherein the wireless intrusion monitoring system comprising one or more sniffer devices spatially disposed within the geographic region for receiving and processing wireless signals within the geographic region.

6. The method of claim 5 wherein the detecting the wirelessly active access point device in the geographic region being using a sniffer device from the one or more sniffer devices.

7. The method of claim 5 wherein the receiving the first one or more wireless frames and the second one or more wireless frames being using a first sniffer device and a second sniffer device, respectively, from the one or more sniffer devices.

8. The method of claim 1 wherein the transferring the one or more marker packets to the wired portion of the local area network being using a device connected to the wired portion of the local area network using a wired Ethernet connection.

9. The method of claim 8 wherein the device including at least a sniffer device, at least an Ethernet switch device, or at least a router device.

10. A wireless access monitoring system including a way of removing false alarms resulting from spoofing, in detecting access point devices that provide unauthorized wireless access to local area computer networks, the system comprising:
- a wired network interface for coupling the system to a wired portion of a local area network within a geographic region;
- a wireless network interface for receiving wireless signals within the geographic region;
- a processing unit comprising one or more microprocessor devices; and
- a memory unit coupled to the processing unit and storing computer readable instructions to be executed by the processing unit to perform steps of:
  - detecting a plurality of wireless access points (APs) whose radio coverage intersects with the selected geographic region, the plurality of the wireless access points including a first wireless access point (AP1) that is connected to the wired portion of the local area network and a second wireless access point (AP2) that is not connected to the wired portion of the local area network;
  - determining a first basic service set identifier (BSSID1) which identifies the AP1;
  - generating one or more marker packets, the one or more marker packets:
    - including an authentication information which is a predetermined function of at least the BSSID1,
    - including a format information, and
    - being structured to be received from the wired portion of the local area network by at least a subset of access points connected to the wired portion of the local area network and to be outputted as first one or more wireless frames by the at least the subset of the access points while maintaining at least a portion of the format information in the outputted one or more wireless frames;
  - transferring the one or more marker packets to the wired portion of the local area network using the wired network interface;
  - receiving at least a subset of the first one or more wireless frames, wherein the at least the subset of the first one or more wireless frames include the BSSID1;
  - ascertaining that the at least the subset of the first one or more wireless frames include the authentication information;
  - inferring that the AP1 is connected to the wired portion of the local area network;
  - receiving second one or more wireless frames using the wireless network interface, the second one or more wireless frames including a second basic service set identifier (BSSID2) different from the BSSID1, wherein the second one or more wireless frames:
    - being transmitted during a spoofing attack process, and
    - imitating the at least the portion of the format information to make an access point identified with the BSSID2 (AP2), which is not connected to the wired portion of the local area network, falsely inferred as connected to the wired portion of the local area network in the wireless access monitoring system to generate a false alarm on unauthorized access to the wired portion of the local are network;
  - ascertaining that the second one or more wireless frames are devoid of an authentication information which is the predetermined function of at least the BSSID2;
  - inferring that the second one or more wireless frames do not indicate that the AP2 is connected to the wired portion of the local area network; and
  - classifying the plurality of the APs into at least one or more unauthorized APs from the plurality of APs that are inferred as connected to the wired portion of the local area network and one or more external APs from the plurality of APs that are inferred as not connected to the wired portion of the local area network.

11. The system of claim 10 wherein the wired network interface including a wired Ethernet interface and the wireless network interface including an IEEE 802.11 network interface.

12. The system of claim 10 wherein the predetermined function is a hash function.

13. The system of claim 10 wherein the predetermined function is a cryptographic hash function.

14. The system of claim 10 wherein the AP2 being an access point within a neighborhood of the geographic region and not connected to the wired portion of the local area network.

* * * * *